Oct. 8, 1946.                J. WEITS ET AL                2,409,088
              DEVICE FOR WASHING AND CONDITIONING AIR AND GASES
                              Filed July 9, 1943

INVENTOR.
John Weits and Hans Held
BY    *Willis B Rae*
                ATTORNEY Patented Oct. 8, 1946

2,409,088

UNITED STATES PATENT OFFICE 2,409,088

DEVICE FOR WASHING AND CONDITIONING AIR AND GASES

John Weits, Baldwin, and Hans Held, Flushing, N. Y.

Application July 9, 1943, Serial No. 493,962

5 Claims. (Cl. 183—21)

This invention relates to a device for washing and conditioning air and gases. It is the object of this invention to produce an apparatus by which a current of air may be continuously subjected to contact with a moving spray of water, which will give a thorough co-mingling of the air and water and then provide a thorough separation of the air and water after treatment, with a maximum simplicity of construction. It is a further object to produce an apparatus which will maintain the current of air in a circular or whirling motion while it is being passed through the spray of water so that it may mingle thoroughly with the spray and at the same time project any particles which may become entrained in the air stream outwardly against the interior of the apparatus.

The invention accordingly comprises an article of manufacture possessing the features, properties and the relation of elements which will be exemplified in the article hereinafter described and the scope of the application of which will be indicated in the claim.

For a fuller understanding of the nature and objects of the invention, reference should be had to the following detailed description taken in connection with the accompanying drawing, in which.

Figure 1:
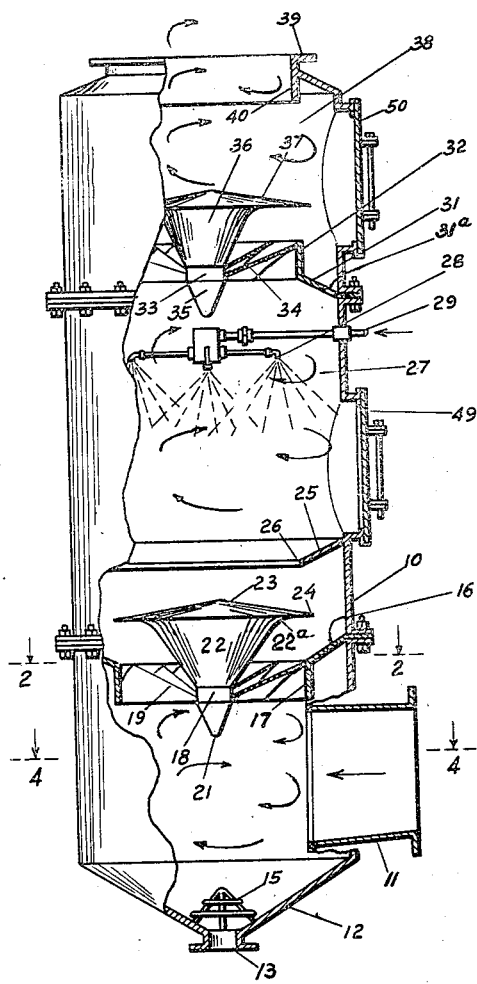
Fig. 1 is an elevation partly in section of an apparatus embodying this invention, the section line being along the vertical center line except at the bottom where it is taken on a plane central to the inlet.
Figure 2:
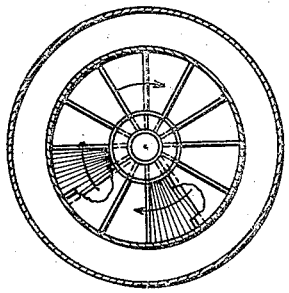
Fig. 2 is a section along the line 2—2 of Fig. 1.
Figure 4:
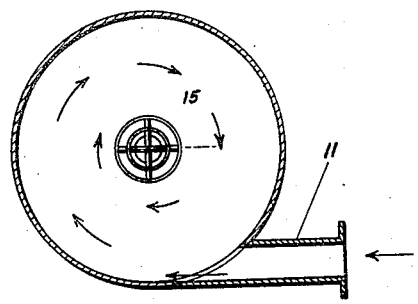
Fig. 4 is a section on the line 4—4 of Fig. 1.

In the drawing the numeral 10 designates a cylindrical casing having a vertical axis and having an air inlet 11 at the lower end attached to the casing tangentially (as shown in Fig. 4) so that the entering air is caused to move in a spiral path through the casing. The lower end of the casing 10 below the inlet 11 forms an intake chamber, the lower end of which may conveniently be made conical as shown at 12, discharging into a discharge opening 13 through a strainer 15.

Figure 3:
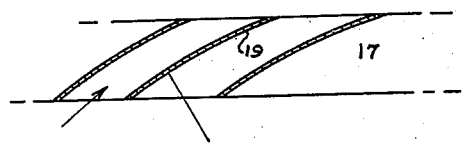
Fig. 3 is a fragmentary development of the depending flange on the annular deflector at the point where it is attached to the outer ends of the vanes showing the angularity of inclination of the vanes.

Within the casing 10 and just above the inlet 11 is an inwardly and downwardly extending frustro conical annular baffle 16 carrying a depending flange 17. Centrally spaced within this flange is a hub 18 supported from the flange by a series of radial vanes 19 which are inclined to the vertical and are attached to the flange 17 at their outer ends and to the hub 18 at their inner ends. These vanes are set at an angle to the axis, as shown at 20 in Fig. 3, in the direction in which the rotating column of air passes through them, so that by their inclination they tend to maintain the whirling motion of the air column and at the same time distribute the air around the periphery of the casing as it proceeds upwardly. The most favorable angle we have found is about 30° at the bottom, sloping to about 15° at the top.

The hub 18 is provided with a lower conical end 21.

The vanes 19 preferably have their upper edges slanting downwardly toward the hub 18 and there is attached to the upper end of the hub 18, forming substantially an expanding portion of it, an inverted conical deflector 22, upon which is mounted an upright conical deflector 23, the edge 24 of which extends over the edge of the deflector 22 so that the air, passing with a whirling motion upwardly between the vanes 19, is thrown smoothly outwardly toward the walls of the casing 10 but without directly impinging thereon. The deflector 22 has its outer edge rounded, as shown at 22ᵃ. Situated above the conical deflector 23 is an inwardly and downwardly extending frustro conical annular baffle 25. This baffle separates the casing into a washing chamber surrounding deflector 22, and above it a spray chamber.

Above the baffle 25 is the spray chamber 27, in which is arranged a plurality of jets 28 fed from a common source of water 29. The upper wall of this chamber is formed by a frustro conical annular baffle 31 which may extend inwardly and upwardly to a flange 32, which in turn supports a hub 33 by means of inclined radial vanes 34 which may be similar in all respects to the flange 17, vanes 19 and hub 18 previously described.

Similarly, this hub 33 may have a conical lower end 35 and an inverted conical deflector 36 at its upper end supporting an upright conical deflector 37. These parts are similar to the conical end 21 and deflector 22 and 23 already described. A series of outlets 31ᵃ are provided in the edge of deflector 31 to permit water to run through baffles 31 into the chamber 27.

The deflectors 36 and 37 lie in a separating chamber 38, the upper end of which is defined by an outlet coupling 39 having a downwardly extending flange 40 preferably of smaller diameter than the conical deflector 37.

With the foregoing construction it will be clear that the air entering tangentially through the inlet opening 11 is caused to rotate about the interior of the casing as a column, encountering water as it drips from the flange 17 and from the vanes 19. As it passes upwardly between the vanes 19, it passes through a sheet of water dripping from the edge 24. Part of this water is immediately thrown outwardly against the interior of the casing 10 or against the baffle 16 and runs down between the vanes 19 to be thrown outwardly by the centrifugal force against the cylindrical wall, and some of it is carried upwardly by the air current. The air, however, passes smoothly past the edge 24 of deflector 23—24, passing inwardly toward the axis of the device and thus through the path of the water dripping from the edge 26 of the baffle 25, and passes upwardly through the center to pass this edge 26 moving against the current of water falling from the jets and again being thrown outwardly by the centrifugal force.

Within the chamber 27 the combination of the rotating motion of the air column and the action of the jets causes a very thorough mingling of the air and the water without substantial eddy currents. The particles of water are thrown outwardly against the interior walls of the casing or upon the baffle 25, thus furnishing the supply of water for the sheet which falls from the edge 26.

The vanes 34 and the conical deflectors 36 and 37 serve to eliminate from the air any drops which have been entrained therein, causing these drops to be caught by the vanes 34 or to be thrown outwardly to the interior walls of the chamber 38, to be discharged through openings 31ª. Thus the air, as it passes outwardly through the coupling 39, is substantially free from any entrained moisture.

Figure 5:
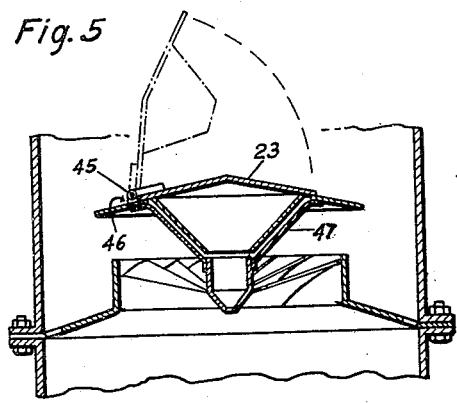
Fig. 5 is a vertical section showing a modified form of deflector.

In the construction, as shown in Fig. 5, the conical deflector 23 or 37 is pivoted as at 45 to a bracket 46 extending upwardly from the hubs 18 or 33, and the other edge may be supported by a suitable support 47.

The chambers 27 and 38 are each provided with an access door 49 or 50 through which the interior parts may be reached, and when the pivoted deflector shown in Fig. 5 is used, the deflector may be thrown upwardly to provide access to the vanes 19 or 34 to permit proper cleansing of the same.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. An air washing device comprising a cylindrical casing having a vertical axis forming an intake chamber and a spray chamber above said intake chamber, said intake chamber having a tangential inlet to establish a rotary motion in incoming air to form a rotating column within said intake chamber, said spray chamber having jets for projecting spray through air rotating in said spray chamber, an annular baffle extending inwardly and downwardly from said casing between said chambers and having a central opening, an inverted conical deflector supported within and extending down into said opening forming with said baffle an upwardly and outwardly extending annular channel, vanes attached along their inner edges to said conical deflector and extending from said point of attachment, radially outward, and attached along their outer ends to the edges of the opening in said annular baffle, dividing the said channel into a plurality of upwardly extending passageways, said vanes being inclined to the vertical to receive the rotating column of air from said inlet chamber and maintain it in rotation and deliver it smoothly into the spray chamber.

2. In an air washer, in combination, a cylindrical casing having a vertical axis forming a spray chamber and a separating chamber above said spray chamber, means to establish a rotary upwardly moving column of air within said spray chamber, jets within said spray chamber for projecting spray through said air column, an annular baffle extending inwardly from said casing between said chambers and having a central opening, an inverted conical deflector within and extending down into said opening, and forming with said baffle an upwardly and outwardly extending annular channel, vanes attached along their inner edges to said conical deflector and extending from said point of attachment radially outward and attached along their outer ends to the edges of said opening dividing the said channel into a plurality of upwardly extending passageways, said vanes being inclined to the vertical to receive the rotating column of air from said spray chamber and maintain it in rotation and deliver it smoothly into the separating chamber.

3. A device according to claim 2 in which said annular baffle is provided with a drain opening to drain into said spray chamber, water flowing down the inside of said separating chamber.

4. An air cleansing device comprising in combination a cylindrical casing having a vertical axis, comprising an intake chamber at the bottom, a spray chamber above said intake chamber and a separating chamber above said spray chamber, said intake chamber having a tangential inlet to establish a rotary motion in incoming air to form a rotating column within said intake chamber, said spray chamber having jets for projecting a spray through air rotating in said spray chamber, an annular baffle extending inwardly and downwardly from said casing between said intake chamber and said spray chamber, a second annular baffle extending inwardly from said casing between the spray chamber and the separating chamber, each of said baffles having a central opening, an inverted conical deflector supported within and extending downwardly into the opening of each of said baffles, each forming with the baffle an upwardly and outwardly extending annular channel, a set of vanes for said first mentioned conical deflector and a set of vanes for said second mentioned conical deflector, all of said vanes being attached along their inner edges to each of said conical deflectors and extending from said point of attachment radially outward, and attached along their outer ends to corresponding annular baffle dividing each of said channels into a plurality of upwardly extending passageways, said vanes being inclined to the vertical, one set to receive the rotating column of air from said intake chamber and maintain it in rotation and deliver it smoothly into the spray chamber and the other set to receive the rotating column of air from said spray chamber and maintain it in rotation and deliver it smoothly into the separating chamber.

5. A device according to claim 4 in which said baffle between the spray chamber and the separating chamber has a drain opening at its periphery, leading into the spray chamber.

JOHN WEITS.
HANS HELD.